Patented Dec. 26, 1950

2,535,312

UNITED STATES PATENT OFFICE 2,535,312

AZO DYESTUFFS

Mordecai Mendoza, Blackley, Manchester, England, assignor to Imperial Chemical Industries Limited, a corporation of Great Britain No Drawing. Application August 22, 1949, Serial No. 111,771. In Great Britain September 8, 1948

3 Claims. (Cl. 260—173)

This invention relates to new azo dyestuffs and more particularly to new trisazo dyestuffs for leather.

According to my invention I provide a process for the manufacture of new azo dyestuffs which comprises coupling in alkaline medium two molecular proportions of diazotised 4-nitro-4'-amino-diphenylamine-2-sulphonic acid with the monoazo compound obtained by coupling in acid medium one molecular proportion of a diazotised 1-(m- or p-aminobenzoyl) amino-8-naphthol-mono-, or di-sulphonic acid which is unsubstituted in the 7-position, with one molecular proportion of a m-aminophenol or a m-diamine of the benzene series which is capable of coupling twice.

The diazotised 4-nitro-4'-amino-diphenyl-amine-2-sulphonic acid is believed to couple with the monoazo compound both in the 7-position of the naphthalene nucleus and also in the benzene nucleus which is attached to the azo linkage.

The diazotisation and coupling processes and the isolation of the dyestuff may be carried out by the conventional methods normally used for dyestuffs of this kind.

As examples of 1-(m- or p-aminobenzoyl)-amino-8-naphthol-mono- or di-sulphonic acids there may be mentioned 1-(4'-aminobenzoyl)-amino-8-naphthol-3:6-disulphonic acid, 1-(3'-aminobenzoyl) amino - 8 - naphthol-4-sulphonic acid, 1-(3'-aminobenzoyl) amino - 8 - naphthol-3:6-disulphonic acid, and the corresponding 4:6-disulphonic acid, and as examples of m-diamines there may be mentioned m-phenylene diamine and m-toluylene diamine.

The new dyestuffs of my invention dye leather of all tannages in attractive level brown shades of good all-round fastness properties. They are good non-penetrating (that is surface-dyeing) dyestuffs and they have excellent building-up properties. Generically, these new dyestuffs may be described by the following structural formula:

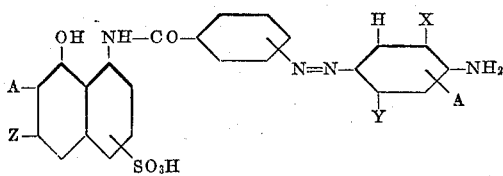

wherein A is the radical

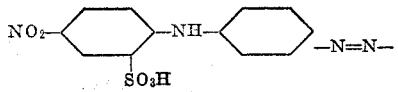

wherein X is a radical selected from the group consisting of H and CH$_3$, and wherein Y is a radical selected from the group consisting of NH$_2$ and OH and wherein Z is a radical selected from the group consisting of H and SO$_3$H.

The invention is illustrated but not limited by the following examples in which the parts are by weight:

Example 1

43.8 parts of 1-(4'-aminobenzoyl) amino-8-naphthol-3:6-disulphonic acid are dissolved in 300 parts of water containing 8 parts of caustic soda. The solution so obtained is stirred and 6.9 parts of sodium nitrite in the form of a 20% aqueous solution are added. The mixture is then added dropwise, at a temperature not exceeding 10° C., to a stirred solution of 30 parts of strong hydrochloric acid ($d=1.16$) in 50 parts of water. The diazo compound separates as a light red brown precipitate. The suspension is allowed to stir for a further 1 hour to complete the formation of the diazo compound. A solution of 10.8 parts of m-phenylene diamine in 150 parts of water containing 15 parts of strong hydrochloric acid ($d=1.16$) is then added in a steady stream. The mixture is stirred for 16 hours to complete the coupling and the monoazo compound is obtained in the form of a dark red-brown precipitate. The precipitate is dissolved by adding sufficient caustic soda solution to make the reaction mixture slightly alkaline and 80 parts of soda ash are then added. 61.8 parts of 4-nitro-4'-amino-diphenylamine-2-sulphonic acid are dissolved in 1000 parts of water at 80° C. containing sufficient soda ash to make the solution faintly alkaline. 16.8 parts of sodium nitrite in the form of a 20% aqueous solution are added to the hot solution and the mixture is stirred until the temperature falls to 55° C. 60 parts of strong hydrochloric acid ($d=1.16$) are then quickly added and the resulting diazo compound is precipitated as a greyish-green gelatinous mass. The mixture is cooled to 10° C., by the addition of sufficient crushed ice and the cooled diazo paste is then added to the alkaline solution of the above monoazo compound. The reaction mixture is stirred for a further six hours and the new trisazo dyestuff is then precipitated from the dark brown solution by adding sufficient salt to make a 20% brine, heating to 80° C. and then acidifying with strong hydrochloric acid. The dyestuff is then filtered off, dried and ground. It forms a blackish-brown powder which is readily soluble in water to give a deep brown solution. It dyes leathers of all tannages in level nigger brown shades of good all-round fastness properties and shows extremely good "build up" properties. If 1-(3'-aminobenzoyl) amino-8-naphthol-3:6-disulphonic acid is substituted for the isomeric compound used above there is obtained a dyestuff which yields greener and duller tones of nigger brown and which possesses similar good fastness properties. This latter dyestuff may be described by the following structural formula:

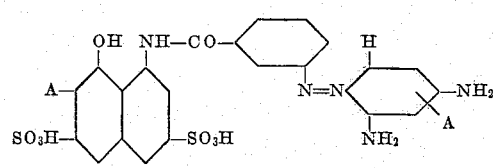

wherein A is the radical

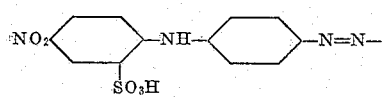

If 1-(3'-aminobenzoyl) amino-naphthol-4:6-disulphonic acid is used, the dyestuff obtained gives slightly redder and brighter shades.

The dyestuff obtained in the above example when utilizing 1-(4'-aminobenzoyl) amino-8-naphthol-3:6-disulphonic acid may be structurally shown by the following formula:

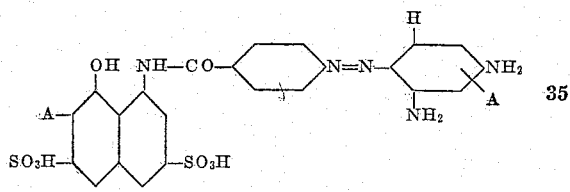

wherein A is the radical

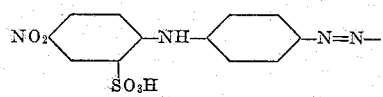

Example 2

The diazo derivative obtained as described in Example 1 from 43.8 parts of 1-(4'-aminobenzoyl) amino-8-naphthol-3:6-disulphonic acid is combined with 10.9 parts of m-amino-phenol dissolved in 150 parts of water containing 15 parts of strong hydrochloric acid ($d=1.16$) and the resulting monoazo compound is further coupled with the diazo derivative obtained from 61.8 parts of 4-nitro-4'-amino-diphenylamine-2-sulphonic acid. The trisazo dyestuff thus obtained is isolated as described in Example 1. It yields redder shades on leather than the product of Example 1 and possesses equally good dyeing and fastness properties.

Example 3

43.8 parts of 1-(3'-aminobenzoyl) amino-8-naphthol-3:6-disulphonic acid are diazotised by the method described for the isomeric compound in Example 1 and the diazo compound is allowed to couple in mineral acid medium with 12.2 parts of m-toluylene diamine. The monoazo dyestuff obtained is further coupled with the diazo derivative from 61.8 parts of 4-nitro-4'-amino-diphenylamine-2-sulphonic acid and the new trisazo dyestuff is obtained by working in similar manner to that described in Example 1. The new dyestuff dyes leather of all tannages in level greenish nigger brown shades.

Example 4

35.8 parts of 1-(3'-aminobenzoyl) amino-8-naphthol-4-sulphonic acid are dissolved in 300 parts of water containing 4 parts of caustic soda. The solution is stirred and 6.9 parts of sodium nitrite are added as a 20% aqueous solution. The mixture is then added dropwise at a temperature not exceeding 10° C., to a stirred mixture of 30 parts of strong hydrochloric acid ($d=1.16$) and 50 parts of water. To the resulting red-brown diazo suspension there is added a solution of 10.8 parts of m-phenylene diamine in 150 parts of water containing 15 parts of strong hydrochloric acid ($d=1.16$) and the mixture is stirred for 16 hours to complete the coupling. The monoazo compound so formed is then further coupled with the diazo derivative obtained from 61.8 parts of 4-nitro-4'-amino-diphenylamine-2-sulphonic acid by the method described in Example 1. The trisazo dyestuff obtained dyes leather in nigger brown shades.

I claim:

1. Azo dyestuffs of the formula

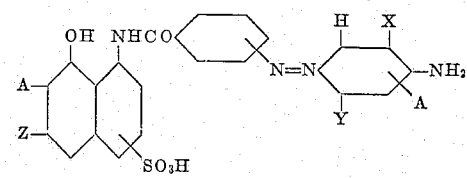

wherein A is the radical

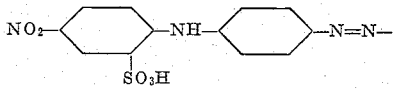

wherein X is a radical selected from the group consisting of H and CH₃, wherein Y is a radical selected from the group consisting of NH₂ and OH and wherein Z is a radical selected from the group consisting of H and SO₃H.

2. The azo dyestuff of the formula

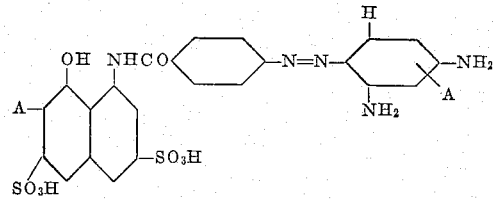

wherein A is the radical

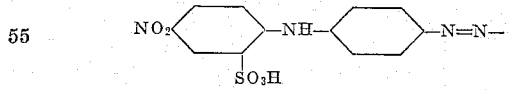

3. The azo dyestuff which in acid form has the formula

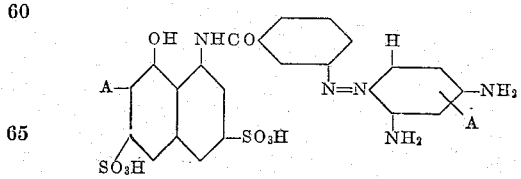

wherein A is the radical

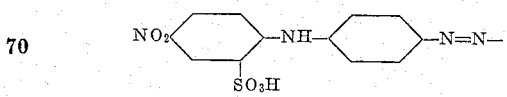

MORDECAI MENDOZA.

No references cited.